(12) United States Patent
Somarowthu et al.

(10) Patent No.: US 12,575,499 B2
(45) Date of Patent: Mar. 17, 2026

(54) WINDROWER IMPLEMENT WITH MERGER ATTACHMENT

(71) Applicant: DEERE & COMPANY, Moline, IL (US)

(72) Inventors: Mahesh Somarowthu, Pune (IN); Mohan A. Vadnere, Pune (IN)

(73) Assignee: Deere & Company, Moline, IL (US)

( * ) Notice: Subject to any disclaimer, the term of this patent is extended or adjusted under 35 U.S.C. 154(b) by 483 days.

(21) Appl. No.: 18/355,019

(22) Filed: Jul. 19, 2023

(65) Prior Publication Data

US 2025/0024784 A1 Jan. 23, 2025

(51) Int. Cl.
| *A01D 57/20* | (2006.01) |
| *G06T 7/13* | (2017.01) |
| *G06T 7/73* | (2017.01) |

(52) U.S. Cl.
CPC ................ *A01D 57/20* (2013.01); *G06T 7/13* (2017.01); *G06T 7/73* (2017.01); *G06T 2207/10016* (2013.01); *G06T 2207/20084* (2013.01); *G06T 2207/30188* (2013.01); *G06T 2207/30252* (2013.01)

(58) Field of Classification Search
CPC .................................................... A01D 57/20
See application file for complete search history.

(56) References Cited

U.S. PATENT DOCUMENTS

| 4,739,610 | A | 4/1988 | Schultz | |
| 6,971,225 | B1 | 12/2005 | Kempf et al. | |
| 2003/0024228 | A1* | 2/2003 | Franet | A01D 57/20 |
| | | | | 56/192 |
| 2009/0313964 | A1* | 12/2009 | McLean | A01D 43/10 |
| | | | | 56/192 |
| 2016/0309655 | A1* | 10/2016 | Treffer | A01D 43/04 |
| 2017/0280627 | A1* | 10/2017 | Treffer | A01D 43/086 |
| 2019/0327897 | A1* | 10/2019 | McKinnis, Jr. | A01D 41/1274 |
| 2021/0185914 | A1* | 6/2021 | Stephens | A01D 61/00 |

FOREIGN PATENT DOCUMENTS

EP 3476199 A1 * 5/2019 ......... A01D 41/1271

* cited by examiner

*Primary Examiner* — Claude J Brown

(57) ABSTRACT

A windrower implement includes a merger attachment having a conveyor positioned relative to an implement head to receive discharged crop material from the implement head and convey the crop material to a laterally offset location on a discharge side of the merger attachment. An image sensor is positioned to capture an image of a windrow laterally offset from the central longitudinal axis on the discharge side of the frame. A merger controller is disposed in communication with the image sensor and is operable to capture an image of the windrow with the image sensor, identify and locate an edge of the windrow in the captured image relative to the conveyor. The merger controller may then control a current speed of the conveyor based on the location of the edge of the windrow so that crop material is discharged onto the existing windrow.

15 Claims, 4 Drawing Sheets

100

Capture Image of Windrow

104

Identify Edge of Windrow

106

Determine Location of Edge of Windrow

108

Calculate Desired Throw Distance

110

Determine Desired Conveyor Speed

112

Control Conveyor for Desired Conveyor Speed

102

Display Image on Visual Display

WINDROWER IMPLEMENT WITH MERGER ATTACHMENT

TECHNICAL FIELD

The disclosure generally relates to a windrower implement having a merger attachment.

BACKGROUND

A windrower implement is an agricultural machine that cuts standing crop material while moving through a field, and forms the cut crop material into a swath or windrow. Typically, the windrower implement forms the windrow on and along a general longitudinal centerline of the windrower implement, generally between the left and right ground engaging devices, e.g., tires or tracks. The windrower implement may be equipped with a merger attachment. The merger attachment is configured to form the windrow laterally offset from the centerline of the windrower implement, generally outside the left or right ground engaging devices. The merger attachment may be deployed to form the windrow at an offset position relative to the centerline of the windrower implement, or may be stowed and disengaged, whereby the windrow is formed generally along the centerline of the windrower implement.

When harvesting crop material from a field, the windrower implement typically makes several parallel passes through the field with each pass cutting a width of the crop material. An operator of the windrower implement may control the windrower implement to execute a single pass windrow configuration in which the operator keeps the merger attachment continuously disengaged for each respective pass such that each respective pass through the field generates a respective windrow aligned with the longitudinal centerline of the windrower implement during that respective pass. The operator may alternatively control the windrower implement to execute a double pass windrow configuration in which the operator disengages the merger attachment while executing a belly pass, whereby the windrow is formed along the centerline of the windrower implement. After completing the belly pass, the operator aligns the windrower implement immediately adjacent to the belly pass with the merger attachment deployed to execute a first merger pass. While executing the first merger pass, the merger attachment deposits the crop material from the first merger pass on or next to the windrow formed from the belly pass, thereby placing the windrow from two adjacent passes through the field together as a single windrow.

While the multiple passes through the field are generally parallel, some deviations in each pass and/or in adjacent paths may occur. As such, each pass may not be perfectly linear, and each adjacent path may not be perfectly parallel. For example, obstacles in the field, ground contours, operator deviation, etc., may cause a centerline of adjacent paths followed through the field to vary from perfectly parallel. In addition, crop conditions throughout the field, e.g., crop volume, density, moisture content, etc., are constantly changing. When executing a double pass windrow operation, variations between the centerlines of adjacent paths, i.e., the belly pass and the first merger pass, may affect the distance the crop material is discharged from the merger attachment. For example, an increase in the distance between the belly pass and the first merger pass may cause the crop material discharged from the merger attachment to fall short of the windrow, thereby failing to properly form a single windrow during the double pass windrow operation.

In addition, changing crop conditions may further affect the distance the crop material is discharged from the merger attachment.

SUMMARY

A windrower implement is provided. The windrower implement includes a frame extending along a central longitudinal axis between a forward end and a rearward end relative to a direction of travel during operation. An implement head is attached to the frame proximate the forward end thereof. The implement head is operable to cut standing crop material and discharge cut crop material in a rearward direction along the central longitudinal axis. A merger attachment is coupled to the frame rearward of the implement head. The merger attachment includes a conveyor positioned relative to the implement head to receive discharged crop material from the implement head and convey the crop material to a laterally offset location on a discharge side of the frame relative to the central longitudinal axis. An image sensor is positioned to capture an image of a windrow laterally offset from the central longitudinal axis on the discharge side of the frame. A merger controller is disposed in communication with the image sensor and the merger attachment. The merger controller includes a processor and a memory having a merger control algorithm stored thereon. The processor is operable to execute the merger control algorithm to capture an image of the windrow with the image sensor, identify an edge of the windrow in the captured image, and determine a location of the edge of the windrow relative to the conveyor. The merger controller may then control a current speed of the conveyor based on the location of the edge of the windrow, whereby the cut crop material discharged from the conveyor is deposited along the edge of the windrow.

In one aspect of the disclosure, the image sensor is positioned proximate one of the forward end of the frame, the discharge side of the frame, or the rearward end of the frame. In one particular implementation of the disclosure, the image sensor is positioned proximate the discharge side of the frame to capture an image including both the windrow and the crop material discharged from the conveyor.

In one aspect of the disclosure, the image sensor may include, but is not limited to, one of a camera, a stereo camera, an infrared camera, a lidar sensor, and a radar sensor.

In one aspect of the disclosure, the merger controller may include an image processing algorithm including a convolutional neural network operable to analyze the captured image to identify and locate the edge of the windrow within the captured image.

In one aspect of the disclosure, the processor is operable to execute the merger control algorithm to calculate a desired throw distance between the conveyor and the location of the edge of the windrow identified in the captured image. The merger controller may then define a desired conveyor speed based on the desired throw distance and a current mass flow rate of the crop material currently being moved by the conveyor, and control the current speed of the conveyor to achieve the desired speed.

In one aspect of the disclosure, the windrower implement may include a flow sensor operable to detect data related to a mass flow rate of the crop material currently being moved by the conveyor.

In one aspect of the disclosure, the windrower implement may include a location sensor operable to detect data related to a location of the conveyor. The processor may be operable to execute the merger control algorithm to determine a current location of the conveyor from the data detected by the location sensor.

In one aspect of the disclosure, the windrower implement may include a visual display disposed in an operator's station. The processor is operable to execute the merger control algorithm to display the captured image on the visual display. In one implementation of the disclosure, the captured image includes a video image. The processor is operable to execute the merger control algorithm to display the video image on the visual display in real time.

Accordingly, the image sensor is operable to capture an image and/or video of the windrow positioned adjacent to the windrower implement on the discharge side of the merger attachment. Additionally, the image sensor may be positioned to capture both the windrow and the crop discharged from the conveyor of the windrower implement. The merger controller may display the captured image of the visual display device for an operator to view and manually adjust the merger attachment based on the real time image/video from the image sensor to properly form a combined windrow having the desired windrow characteristics, e.g., width, distribution, etc. In another implementation, the merger controller may automatically adjust the current speed of the conveyor so that the crop material is discharged onto and/or immediately adjacent to the windrow to form the combined windrow having the desired windrow characteristics.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
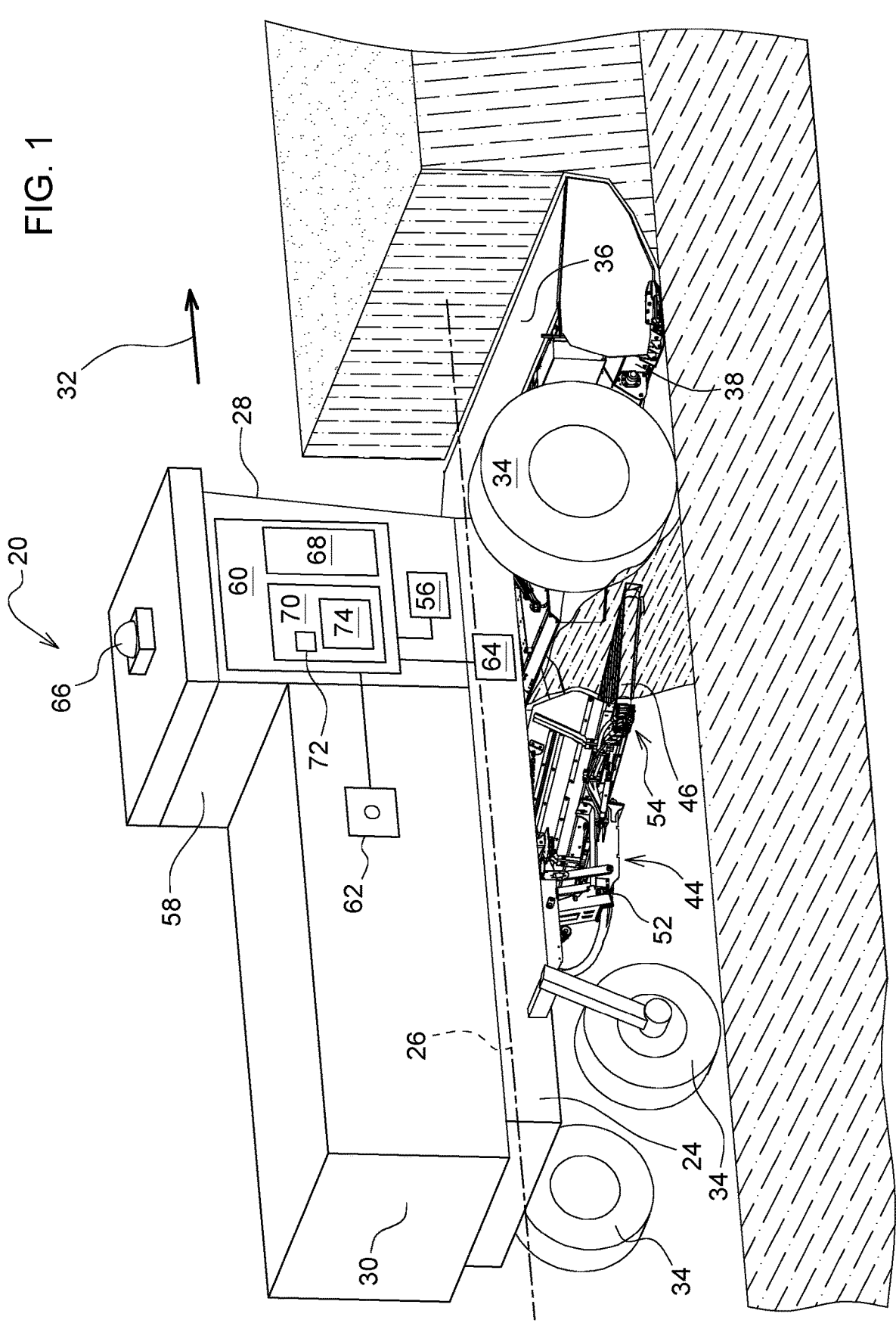
FIG. 1 is a schematic perspective view of a windrower implement.

Referring to the Figures, wherein like numerals indicate like parts throughout the several views, a windrower implement is generally shown at 20 in FIG. 1. The exemplary embodiment of the windrower implement 20 shown in the Figures is configured as a self-propelled windrower. However, it should be appreciated that the teachings of this disclosure may be applied to other platforms, such as but not limited to, a drawn implement configured for connection to a tractor. In one implementation, the windrower implement 20 is operable to mow and collect standing crop material in a field, condition the cut crop material as it moves through the windrower implement 20 to improve is drying characteristics, and then return the conditioned, cut crop material to the field in a windrow 22 or swath.

Figure 2:
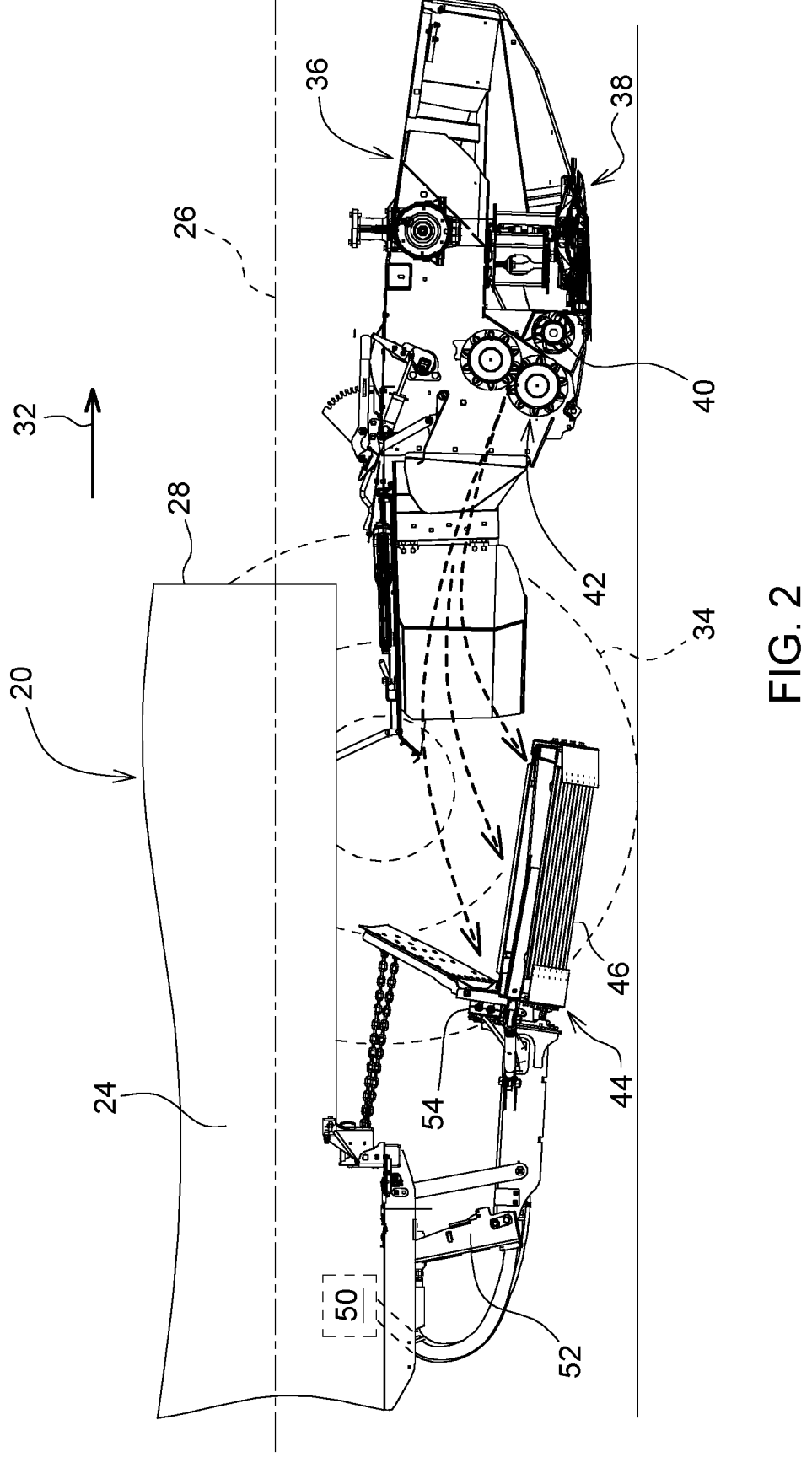
FIG. 2 is a cross sectional view of the windrower implement.

Referring to FIGS. 1-2, the example implementation of the windrower implement 20 includes a frame 24. The frame 24 extends along a central longitudinal axis 26 between a forward end 28 and a rearward end 30 relative to a direction of travel 32 during operation. The central longitudinal axis 26 defines a longitudinal centerline of the windrower implement 20. The frame 24 may include, but is not limited to, the various members, panels, supports, braces, beams, etc., necessary to support the various components and systems of the windrower implement 20 as described below. The windrower implement 20 includes ground engaging devices 34, e.g., tires and/or tracks, which support the frame 24 relative to a ground surface. The ground engaging devices 34 may be powered to move the windrower implement 20 across the ground surface.

The windrower implement 20 further includes an implement head 36. The implement head 36 is attached to the frame 24 proximate the forward end 28 of the frame 24. The implement head 36 is operable to discharge crop material in a rearward direction generally along the central longitudinal axis 26. In addition, the implement head 36 may further cut the crop material and condition the crop material to aid in dry down.

In one implementation, the implement head 36 may include, but is not limited to, a cutting mechanism 38. The cutting mechanism 38 is coupled to the frame 24 and is operable to cut standing crop material in a field. The cutting mechanism 38 may include any mechanism that is capable of cutting the crop material. For example, the cutting mechanism 38 may be embodied as a rotary disc cutter bar. However, the cutting mechanism 38 is not limited to the exemplary embodiment of the rotary disc cutter bar. As such, it should be appreciated that the cutting mechanism 38 may vary from the exemplary embodiment noted herein.

As understood in the art, the rotary disc cutter is supported by the frame 24. The cutter bar extends along an axis that is disposed generally transverse to the direction of travel 32 of the windrower implement 20. The cutter bar includes a plurality of cutting discs spaced along the cutter bar for rotation about respective vertical axes. Each of the cutting discs is coupled to a drivetrain to which power is coupled for causing them to rotate in appropriate directions, for delivering cut crop material to an auger 40 disposed rearward of the cutting mechanism 38.

The auger 40 may pass the crop material rearward to a crop conditioning system 42. In particular, the auger 40 may be positioned in front of and lower than the crop conditioning system 42. In operation, the design of the auger 40 enables the delivery of cut crop material into the crop conditioning system 42. The cutting mechanism 38 delivers cut crop material to the auger 40, which in turn may delivers the cut crop material rearward for further processing by the crop conditioning system 42. The crop conditioning system 42 may include, but is not limited to, an impeller style conditioning system or a pair of counter rotating conditioner rolls, as is understood in the art. The conditioned crop material is expelled rearward by the crop conditioning system 42, and may be formed into the windrow 22 or swath by upright right and left forming boards and a swath board. The cut and conditioned crop material is expelled or discharged from the crop conditioning system 42 in the rearward direction, whereafter the crop material moves a short distance through the air before accumulating on the ground in the formed windrow 22.

Referring to FIGS. 1-2, the windrower implement 20 includes a merger attachment 44. The merger attachment 44 is coupled to the frame 24 rearward of the implement head 36. The merger attachment 44 includes a conveyor 46 that is moveable between a deployed position and a stowed position. When the conveyor 46 is disposed in the deployed position, the conveyor 46 is positioned relative to the implement head 36 to receive discharged crop material from the implement head 36 and convey the crop material laterally relative to the central longitudinal axis 26 to form the windrow 22 laterally offset from the central longitudinal axis 26 on a discharge side 48 of the central longitudinal axis 26. When the conveyor 46 is disposed in the stowed position, the conveyor 46 is positioned relative to the implement head 36 to not receive discharged crop material from the implement head 36 to form the windrow 22 substantially aligned with the central longitudinal axis 26 along the centerline of the windrower implement 20.

Figure 3:
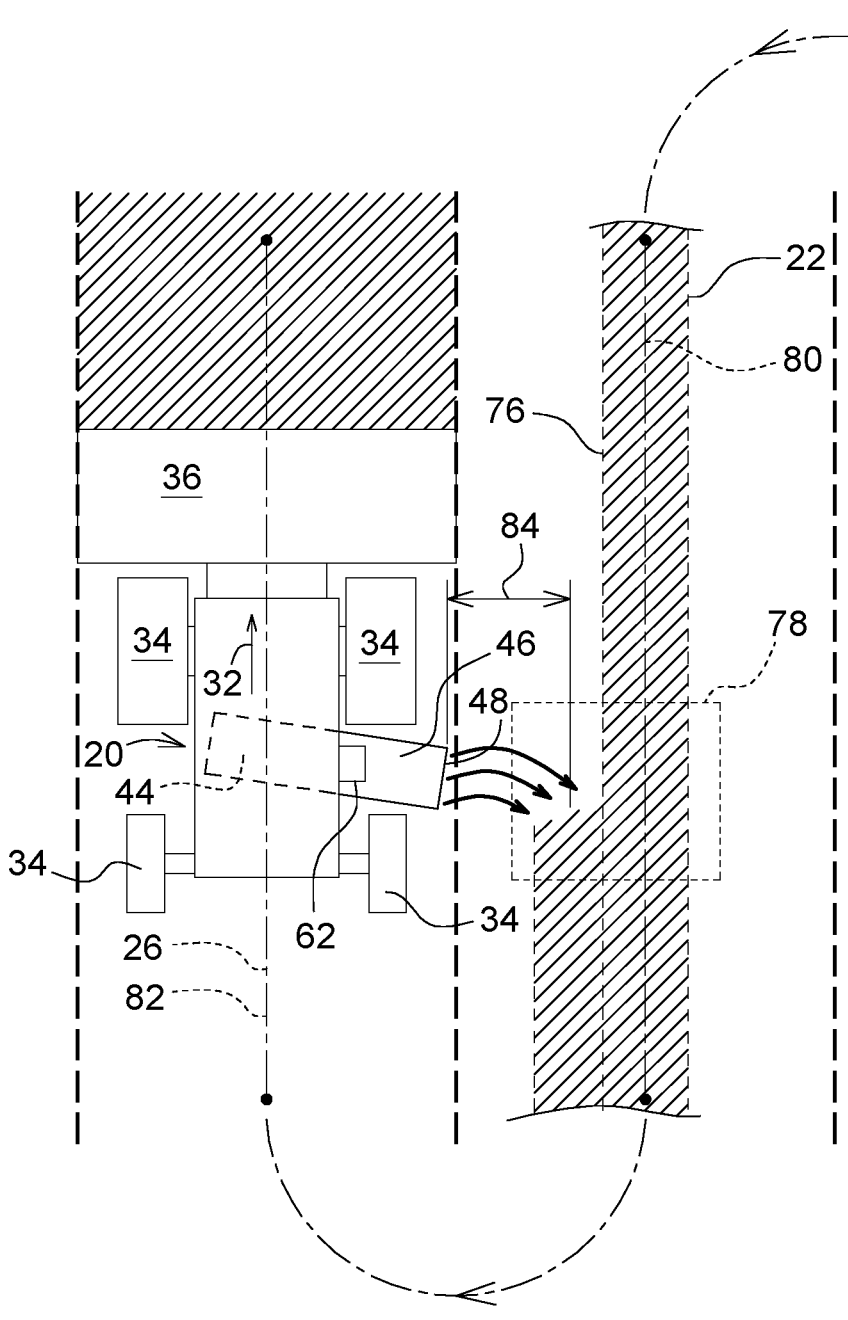
FIG. 3 is a schematic plan view of the windrower implement executing a double pass windrow operation in a field.

Referring also to FIG. 3, the conveyor 46 of the merger attachment 44 may be positioned in the deployed position such that the crop material discharged from the crop conditioning system 42 falls on the conveyor 46 instead of the ground. The crop material discharged from the crop conditioning system 42 is disposed generally along a longitudinal centerline of the windrower implement 20, between left and right ground engaging devices 34 of the windrower implement 20. The conveyor 46 is rotatably driven by an actuator 50, such as but not limited to an electric or hydraulic motor, and may include, for example, a rotatable endless belt, which is operable to convey the crop material laterally relative to the longitudinal centerline of the windrower implement 20, and deposit the crop material on the ground at a laterally offset position on the discharge side 48 of the frame 24 relative to the central longitudinal axis 26 of the frame 24 and the centerline of the windrower implement 20.

With the merger attachment 44 disposed in the deployed position, the crop material is discharged from the implement head 36 and falls onto the conveyor 46 of the merger attachment 44. The conveyor 46 moves or rotates to move the crop disposed thereon laterally outward away from the centerline of the windrower implement 20. The crop on the conveyor 46 is deposited or discharged off a distal end of the conveyor 46, whereafter the crop falls to the ground forming the windrow 22 which is laterally offset from the centerline of the windrower implement 20 on the discharge side 48 of the frame 24.

Referring to FIG. 2, the merger attachment 44 may include a lift structure 52 and a support structure 54. The support structure 54 includes the conveyor 46 for moving the crop material. The lift structure 52 may interconnect the frame 24 of the windrower implement 20 and the support structure 54. The lift structure 52 may be configured to selectively position the support structure 54 and the conveyor 46 thereof in the stowed position and the deployed position. When disposed in the stowed position, the lift structure 52 may position the support structure 54 tightly against the belly of the frame 24, such that the conveyor 46 of the support structure 54 does not engage the cut crop material discharged from the implement head 36 and the windrow 22 may be formed along the central longitudinal axis 26 of the frame 24, i.e., generally along the centerline of the windrower implement 20. When disposed in the deployed position, the lift structure 52 may position the conveyor 46 of the support structure 54 near the ground surface, such that the crop material discharged from the implement head 36 falls on the conveyor 46 of the support structure 54 for lateral movement relative to the central longitudinal axis 26, whereby the windrow 22 may be formed laterally offset form the central longitudinal axis 26. The features, components, structure, and operation of the lift structure 52 and the support structure 54 are understood by those skilled in the art, are not pertinent to the teachings of this disclosure, and are therefore not described in detail herein.

Referring to FIG. 1, the windrower implement 20 may further include a visual display 56. The visual display 56 may be disposed, for example, in a cab or an operator's station 58 of the windrower implement 20. In other implementations, the visual display 56 may be disposed in the cab or the operator's station of an associated tow vehicle. The visual display 56 may include any device capable of generating a visual image in response to a signal. For example, the visual display 56 may include, but is not limited to, a monitor, a touch screen display, or some other similar device.

Referring to FIG. 1, the windrower implement 20 further includes a merger controller 60. The merger controller 60 is operatively coupled to the merger attachment 44 for controlling movement of the merger attachment 44 between the deployed position and the stowed position, and for controlling the actuator 50 of the conveyor 46. The merger controller 60 may further be disposed in communication with the visual display 56 for communicating a signal to the visual display 56, whereby the visual display 56 may generate an image in response to the signa. The merger controller 60 may further be disposed in communication with an image sensor 62, a flow sensor 64, and/or a location sensor 66, described in greater detail below.

The merger controller 60 is operable to receive inputs and data signals, may communicate a control signal to the lift structure 52 and the actuator 50 of the conveyor 46, and may communicate a signal to the visual display 56. While the merger controller 60 is generally described herein as a singular device, it should be appreciated that the merger controller 60 may include multiple devices linked together to share and/or communicate information therebetween. Furthermore, it should be appreciated that the merger controller 60 may be located on the windrower implement 20 or located remotely from the windrower implement 20.

The merger controller 60 may alternatively be referred to as a computing device, a computer, a controller, a control unit, a control module, a module, etc. The merger controller 60 includes a processor 68, a memory 70, and may include all software, hardware, algorithms, connections, sensors, etc., necessary to manage and control the operation of the location sensor 66, flow sensor 64, the image sensor 62, the lift structure 52 and the actuator 50 of the merger attachment 44, and the visual display 56 of the windrower implement 20. As such, a method may be embodied as a program or algorithm operable on the merger controller 60. It should be appreciated that the merger controller 60 may include any device capable of analyzing data from various sensors, comparing data, making decisions, and executing the required tasks.

As used herein, "merger controller 60" is intended to be used consistent with how the term is used by a person of skill in the art, and refers to a computing component with processing, memory, and communication capabilities, which is utilized to execute instructions (i.e., stored on the memory 70 or received via the communication capabilities) to control or communicate with one or more other components. In certain embodiments, the merger controller 60 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The merger controller 60 may be in communication with other components on the windrower implement 20, such as hydraulic components, electrical components, and operator inputs within an operator station of an associated work vehicle. The merger controller 60 may be electrically connected to these other components by a wiring harness such that messages, commands, and electrical power may be transmitted between the merger controller 60 and the other components. Although the merger controller 60 is referenced in the singular, in alternative embodiments the configuration and functionality described herein can be split across multiple devices using techniques known to a person of ordinary skill in the art.

The merger controller 60 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 70 may include any non-transitory/tangible medium which participates in providing data or computer-readable instructions. The memory 70 may be non-volatile or volatile. Non-volatile media may include, for example, optical or magnetic disks and other persistent memory. Example volatile media may include dynamic random access memory (DRAM), which may constitute a main memory. Other examples of embodiments for memory 70 include a floppy, flexible disk, or hard disk, magnetic tape or other magnetic medium, a CD-ROM, DVD, and/or any other optical medium, as well as other possible memory devices such as flash memory.

The merger controller 60 includes the tangible, non-transitory memory 70 on which are recorded computer-executable instructions, including a merger control algorithm 74. The memory 70 may further include an image processing algorithm 72 stored thereon. The processor 68 of the merger controller 60 is configured for executing the merger control algorithm 74 and the image processing algorithm 72. The merger control algorithm 74 implements a method of controlling the merger attachment 44, described in detail below.

The image sensor 62 is positioned to capture an image 78 of a windrow 22 that is laterally offset from the central longitudinal axis 26 on the discharge side 48 of the frame 24. The image sensor 62 may be positioned proximate one of the forward end 28 of the frame 24, the discharge side 48 of the frame 24, or the rearward end 30 of the frame 24. The image sensor 62 may be attached and/or mounted to the frame 24, the operator's station 58, an exterior siding panel, etc. In one example implementation, the image sensor 62 is positioned proximate the discharge side 48 of the frame 24 to capture an image 78 including both the windrow 22 on the discharge side 48 of the frame 24 and the crop material discharged from the conveyor 46 on the discharge side 48 of the frame 24.

The merger controller 60 may include the image processing algorithm 72 stored on the memory 70 thereof. The processor 68 may be operable to execute the image processing algorithm 72 to analyze images in order to identify an edge 76 of the windrow 22 captured in the image 78, and locate the identified edge 76 of the windrow 22 relative to the conveyor 46 or some other feature of the windrower implement 20. The image processing algorithm 72 may include, but is not limited to, a convolutional neural network operable to analyze the captured image 78 to identify and locate the edge 76 of the windrow 22 within the captured image 78. Those skilled in the art should understand that convolutional neural networks, and/or other similar systems, are particularly useful in identifying features and line edges in images. The specific features and operation of the image processing algorithm 72, including the convolutional neural network, are understood by those skilled in the art and are therefore not described in greater detail herein.

The windrower implement 20 may further include the location sensor 66. The location sensor 66 is operable to detect data related to a location of the head implement and/or the frame 24 of the windrower implement 20. The location sensor 66 may include, but is not limited to, a Global Positioning System (GPS) device or other similar location sensor 66. The location sensor 66 is disposed in communication with the merger controller 60 for communicating data therebetween. As is understood by those skilled in the art, the location sensor 66 may detect data related to the position of the head implement over a period of time in order to determine a speed of movement and a direction of movement.

The windrower implement 20 may further include the flow sensor 64. The flow sensor 64 is operable to detect data related to a mass flow rate of the crop material currently being moved by the conveyor 46. As is understood by those skilled in the art, the flow sensor 64 may detect data related to the mass or quantity of crop material being moved by the conveyor 46 over or during a period of time. The flow sensor 64 may include, but is not limited to, an optical sensor for sensing one or more images, such as but not limited to a camera, a high speed camera, a video camera, a near infrared camera, etc. In other implementations, the flow sensor 64 may include, but is not limited to a weight sensor, a force sensor, a pressure sensor, etc. It should be appreciated that the flow sensor 64 may include a device or combination of devices that are capable of sensing the mass flow rate of the crop material and/or data related to the mass flow rate that enables the merger controller 60 to then calculate the mass flow rate. Accordingly, it should be appreciated that the flow sensor 64 may include a device or combination of devices not described herein. The flow sensor 64 is disposed in communication with the merger controller 60 for communicating data therebetween.

As described above, the processor 68 is operable to execute the merger control algorithm 74 to implement a method of controlling the merger attachment 44. As described above, with reference to FIG. 3, the operator may control the windrower implement 20 to execute a double pass windrow configuration in which the operator disengages the merger attachment 44 while executing a belly pass 80, whereby the windrow 22 is formed along the centerline of the windrower implement 20. After completing the belly pass 80, the operator aligns the windrower implement 20 immediately adjacent to the belly pass 80 with the merger attachment 44 deployed to execute a first merger pass 82. While executing the first merger pass 82, the merger attachment 44 deposits the crop material from the first merger pass 82 on or next to the windrow 22 formed from the belly pass 80, thereby placing the crop material from two adjacent passes through the field together as a single windrow 22.

Figure 4:
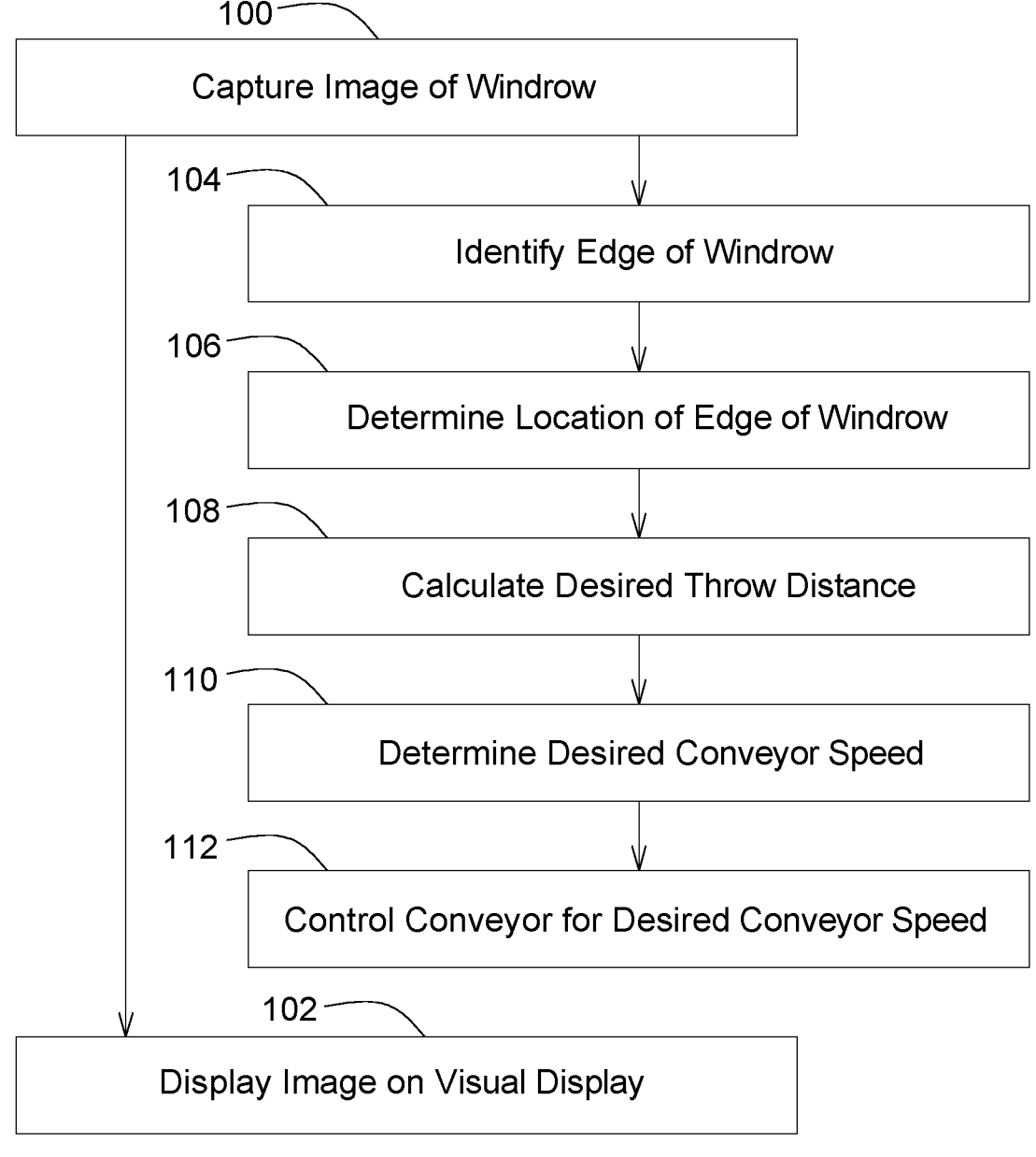
FIG. 4 is a flow chart representing a method of operating the windrower implement.

When executing the first merger pass 82, the merger controller 60 may capture the image 78 of the windrow 22 formed during the belly pass 80 with the image sensor 62. The step of capturing the image 78 of the windrow 22 is generally indicated by box 100 shown in FIG. 4. In one particular implementation, the merger controller 60 may capture the image 78 including both the windrow 22 and the crop material discharged from the conveyor 46 with the image sensor 62.

The merger controller 60 may communicate an image signal to the visual display 56, thereby causing the visual display 56 to generate and display the captured image 78 thereon. The step of displaying the image 78 on the visual display 56 is generally indicated by box 102 shown in FIG. 4. In one implementation, the image 78 includes a continuous video stream. The merger controller 60 may continuously communicate the image signal to the visual display 56, thereby causing the visual display 56 to generate and display the continuous video stream in real time. By doing so, an operator may view the real time video image of the windrow 22 formed during the belly pass 80 with the crop material being discharged from the conveyor 46 onto the windrow 22 during the first merger pass 82. The operator may then adjust and/or control operation of the windrower implement 20 and/or the merger attachment 44 to achieve a desired and/or optimal windrow 22 configuration for the combined windrow 22, i.e., the combination of the belly pass 80 and the first merger pass 82. In one example implementation, the operator may control the operation of the windrower implement and/or the merger attachment 44 directly via the visual display 56. For example, the operator may provide inputs and/or commands via the visual display 56, e.g., a touch-screen display.

Additionally, and/or alternatively, the merger controller 60 may automatically identify the edge 76 of the windrow 22 in the captured image 78. The step of identifying the edge 76 of the windrow 22 is generally indicated by box 104 shown in FIG. 4. The merger controller 60 may use, for example, the image processing algorithm 72 to identify the edge 76 of the windrow 22 formed during the belly pass 80 and captured in the image 78.

The merger controller 60 may further determine a location of the edge 76 of the windrow 22 relative to the conveyor 46 or some other feature of the windrower implement 20. The step of determining the location of the edge 76 of the windrow 22 is generally indicated by box 106 shown in FIG. 4. In one implementation of the disclosure, the merger controller 60 may determine the relative location of the edge 76 of the windrow 22 identified in the captured image 78 relative to the conveyor 46 or some other feature of the windrower implement 20. For example, the image processing algorithm 72 may be used to determine the location of the identified edge 76 of the windrow 22 formed during the belly pass 80 relative to the conveyor 46 or some other feature of the windrower implement 20, such as by referencing a component of the windrower implement 20 visible in the captured image 78 to provide relative positional data between the windrower implement 20, for example the discharge end of the conveyor 46, and the edge 76 of the windrow 22 identified in the captured image 78.

Optionally, the merger controller 60 may then combine the current position of the conveyor 46, for example determined via data from the location sensor 66, with the location of the edge 76 of the windrow 22 identified in the image 78, for example via the image processing algorithm 72, to determine a location of the edge 76 of the windrow 22. The current position of the conveyor 46, e.g., the distal end of the conveyor 46, may be determined and/or calculated using data sensed from the location sensor 66 and the known three-dimensional data relating the location of the distal end of the conveyor 46 relative to the location sensor 66. It should be appreciated that the current position of the conveyor 46 may be determined in some other manner not described herein.

Once the location of the conveyor 46 relative to the edge 76 of the windrow 22 formed during the belly pass 80 is determined, the merger controller 60 may then calculate a desired throw distance 84. The step of calculating the desired throw distance 84 is generally indicated by box 108 shown in FIG. 4. The desired throw distance 84 is the desired horizontal distance the crop material should travel through the air after being discharged from the conveyor 46 and before contacting the ground surface adjacent the edge 76 of the windrow 22 formed during the belly pass 80, i.e., the location of the edge 76 of the windrow 22 identified in the captured image 78. The desired throw distance 84 may be calculated from the relative position of the edge 76 of the windrow 22 identified in the captured image 78 and the conveyor 46 or other feature of the windrower implement 20. For example, the merger controller 60 may calculate the desired throw distance 84 by calculating a perpendicular distance between the edge 76 of the windrow 22 identified in captured image 78 and the current position of the conveyor 46. It should be appreciated that the desired throw distance 84 may include other factors in the calculation thereof, including but not limited to an elevation profile of the ground surface, a ground speed of the windrower implement 20, an angular discharge trajectory of the conveyor 46 relative to the direction of travel 32 and relative to the elevation of the ground surface, wind direction and velocity, etc. The merger controller 60 may calculate the desired throw distance 84 using, but not limited to, geometric relationships and/or equations relating the windrow 22 track location and the position of the conveyor 46, equations of motion, equations of trajectory, etc.

When executing the merger pass adjacent to the belly pass 80, the merger controller 60 may determine a mass flow rate. As noted above, the current mass flow rate is the quantity, volume, or mass of the crop material currently being moved by the conveyor 46 of the merger attachment 44. In one implementation of the disclosure, the current mass flow rate may be determined and/or calculated using data sensed from the flow sensor 64. It should be appreciated that the current mass flow rate may be determined in some other manner not described herein.

Once the desired throw distance 84 is calculated and/or otherwise determined, the merger controller 60 may then define a desired conveyor speed for the conveyor 46. The step of defining the desired conveyor speed is generally indicated by box 110 shown in FIG. 4. The desired conveyor speed may include a linear and/or angular rotational speed of the conveyor 46 necessary to project the discharged crop material form the conveyor 46 the desired throw distance 84. The desired conveyor speed is the speed at which the conveyor 46 continuously rotates or moves during operation. The desired conveyor speed may be based on the desired throw distance 84. Additionally, the desired conveyor speed may further be based on the current mass flow rate of the crop material currently being moved by the conveyor 46.

Once the desired speed of the conveyor 46 has been defined, the merger controller 60 may control the current speed of the conveyor 46 to achieve the desired speed. The step of controlling the conveyor 46 to achieve the desired conveyor speed is generally indicated by box 112 shown in FIG. 4. The merger controller 60 controls the speed of the conveyor 46 by controlling the actuator 50 motivating the conveyor 46. As such, the merger controller 60 communicates a control signal to the actuator 50 to control the actuator 50 to achieve the desired conveyor speed. As described above, the desired conveyor speed is defined to achieve the desired throw distance 84 to land the crop material discharged from the conveyor 46 during the merger pass onto or immediately adjacent to the edge 76 of the windrow 22 identified in the captured image 78 and formed during the belly pass 80. Accordingly, the windrower implement 20 and the process described herein may automatically adjust the speed of the conveyor 46 of the merger attachment 44 to achieve consistent placement of the crop material discharged from the conveyor 46 during the merger pass for a desirable combined windrow 22, thereby automatically accounting for variations between the path followed during the belly pass 80 and the path followed during the merger pass, e.g., non-parallel paths, as well as variations in crop density, crop moisture content, changes in ground elevation profile, etc. The consistent formation of the combined windrow 22 may improve and/or enable for efficient follow-up harvest operations.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A windrower implement comprising:
a frame extending along a central longitudinal axis between a forward end and a rearward end relative to a direction of travel during operation;
an implement head attached to the frame proximate the forward end thereof, wherein the implement head is operable to cut standing crop material and discharge cut crop material in a rearward direction along the central longitudinal axis;
a merger attachment coupled to the frame rearward of the implement head, wherein the merger attachment includes a conveyor positioned relative to the implement head to receive discharged crop material from the implement head and convey the crop material to a laterally offset location on a discharge side of the frame relative to the central longitudinal axis;
an image sensor positioned to capture an image of a windrow laterally offset from the central longitudinal axis on the discharge side of the frame;
a merger controller disposed in communication with the image sensor and the merger attachment, the merger controller having a processor and a memory having a merger control algorithm stored thereon, wherein the processor is operable to execute the merger control algorithm to:
capture an image of the windrow with the image sensor;
identify an edge of the windrow in the captured image;
determine a location of the edge of the windrow relative to the conveyor; and
control a current speed of the conveyor based on the location of the edge of the windrow, whereby the cut crop material discharged from the conveyor is deposited along the edge of the windrow.

2. The windrower implement set forth in claim 1, wherein the image sensor is positioned proximate one of the forward end of the frame, the discharge side of the frame, or the rearward end of the frame.

3. The windrower implement set forth in claim 1, wherein the image sensor is positioned proximate the discharge side of the frame to capture an image including both the windrow and the crop material discharged from the conveyor.

4. The windrower implement set forth in claim 1, wherein the image sensor includes one of a camera, a stereo camera, an infrared camera, a lidar sensor, and a radar sensor.

5. The windrower implement set forth in claim 1, wherein the merger controller includes an image processing algorithm including a convolutional neural network operable to analyze the captured image to identify and locate the edge of the windrow within the captured image.

6. The windrower implement set forth in claim 1, wherein the processor is operable to execute the merger control algorithm to calculate a desired throw distance between the conveyor and the location of the edge of the windrow identified in the captured image.

7. The windrower implement set forth in claim 6, wherein the processor is operable to execute the merger control algorithm to define a desired conveyor speed based on the desired throw distance and a current mass flow rate of the crop material currently being moved by the conveyor.

8. The windrower implement set forth in claim 7, wherein the processor is operable to execute the merger control algorithm to control the current speed of the conveyor to achieve the desired speed.

9. The windrower implement set forth in claim 1, further comprising a flow sensor operable to detect data related to a mass flow rate of the crop material currently being moved by the conveyor.

10. The windrower implement set forth in claim 1, further comprising a location sensor operable to detect data related to a location of the conveyor, wherein the processor is operable to execute the merger control algorithm to determine a current location of the conveyor from the data detected by the location sensor.

11. The windrower implement set forth in claim 1, further comprising a visual display disposed in an operator's station, and wherein the processor is operable to execute the merger control algorithm to display the captured image on the visual display.

12. The windrower implement set forth in claim 11, wherein the captured image includes a video image, and wherein the processor is operable to execute the merger control algorithm to display the video image on the visual display in real time.

13. A windrower implement comprising:

a frame extending along a central longitudinal axis between a forward end and a rearward end relative to a direction of travel during operation;

an implement head attached to the frame proximate the forward end thereof, wherein the implement head is operable to cut standing crop material and discharge cut crop material in a rearward direction along the central longitudinal axis;

a merger attachment coupled to the frame rearward of the implement head, wherein the merger attachment includes a conveyor positioned relative to the implement head to receive discharged crop material from the implement head and convey the crop material to a laterally offset location on a discharge side of the frame relative to the central longitudinal axis;

a visual display operable to generate an image in response to a signal;

an image sensor positioned to capture an image including both of a windrow laterally offset from the central longitudinal axis on the discharge side of the frame and the cut crop material discharged from the conveyor;

a merger controller disposed in communication with the image sensor and the visual display, the merger controller having a processor and a memory having a merger control algorithm stored thereon, wherein the processor is operable to execute the merger control algorithm to:

capture an image including both the windrow and the crop material discharged from the conveyor with the image sensor; and communicate an image signal to the visual display, whereby the visual display generates the image.

14. The windrower implement set forth in claim 13, wherein the image includes a continuous video, and wherein the processor is operable to execute the merger control algorithm to continuously communicate the image signal to the visual display, whereby the visual display generates the continuous image in real time.

15. The windrower implement set forth in claim 13, wherein the image sensor is positioned proximate the discharge side of the frame.

\* \* \* \* \*